Aug. 31, 1965  G. BANSE  3,203,033
LIVESTOCK PEN STRUCTURES
Filed Oct. 25, 1962  3 Sheets-Sheet 1
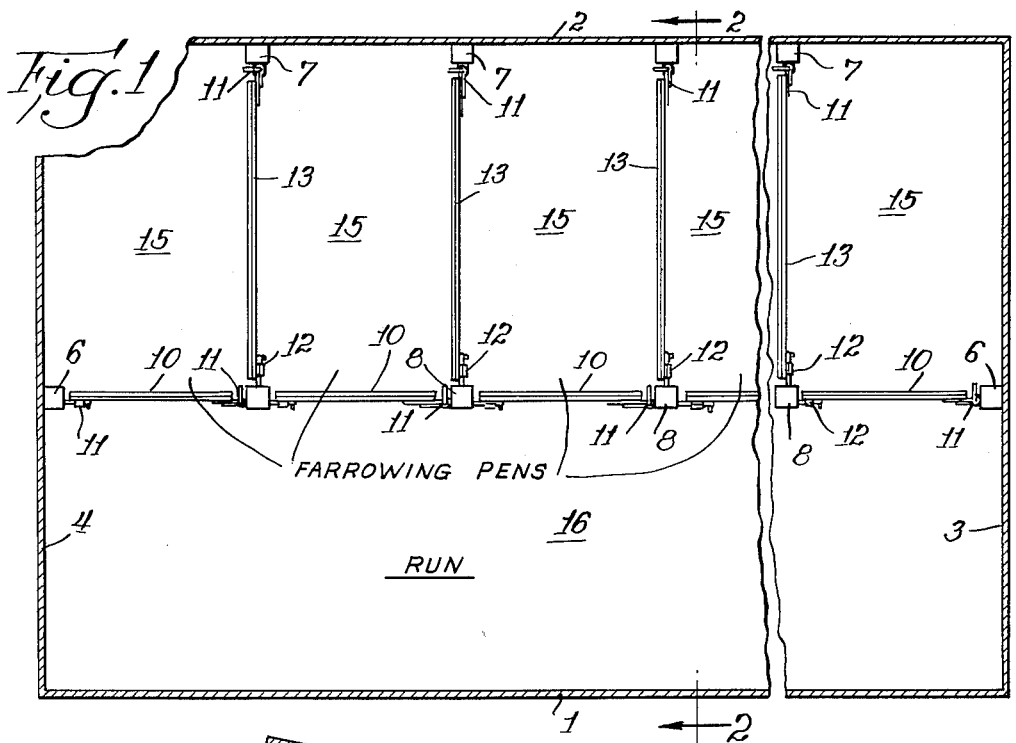
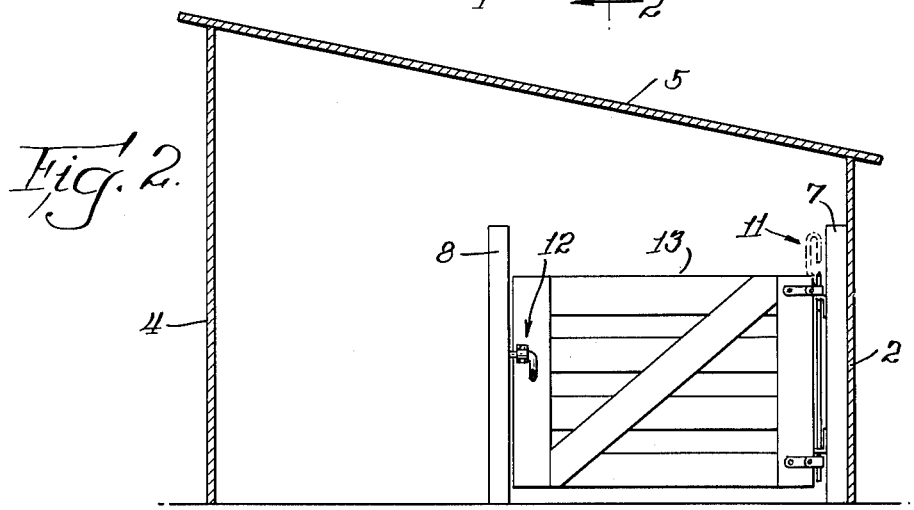
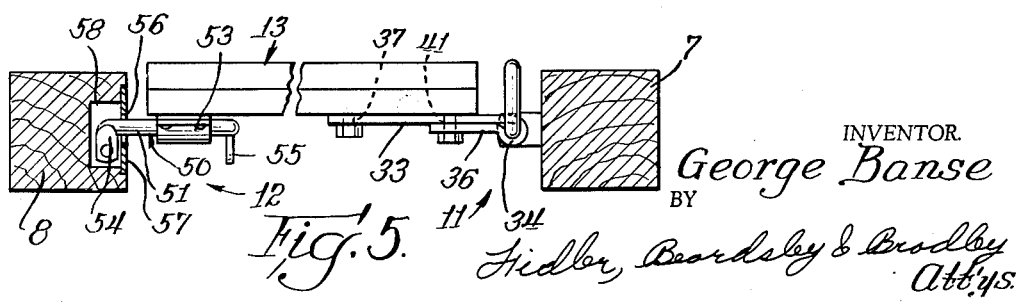
INVENTOR.
George Banse
BY
Fiedler, Beardsley & Brodley
Attys.

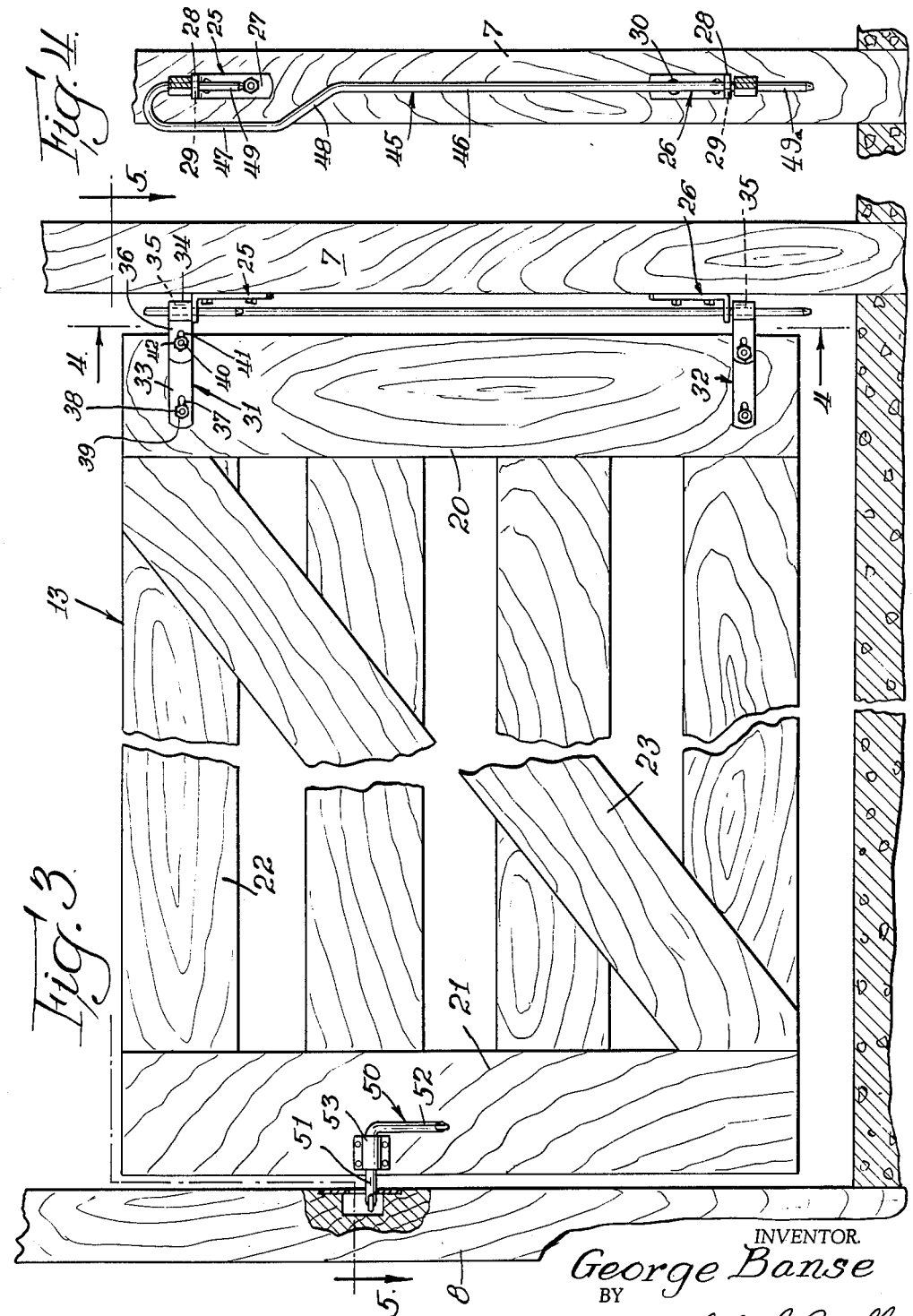

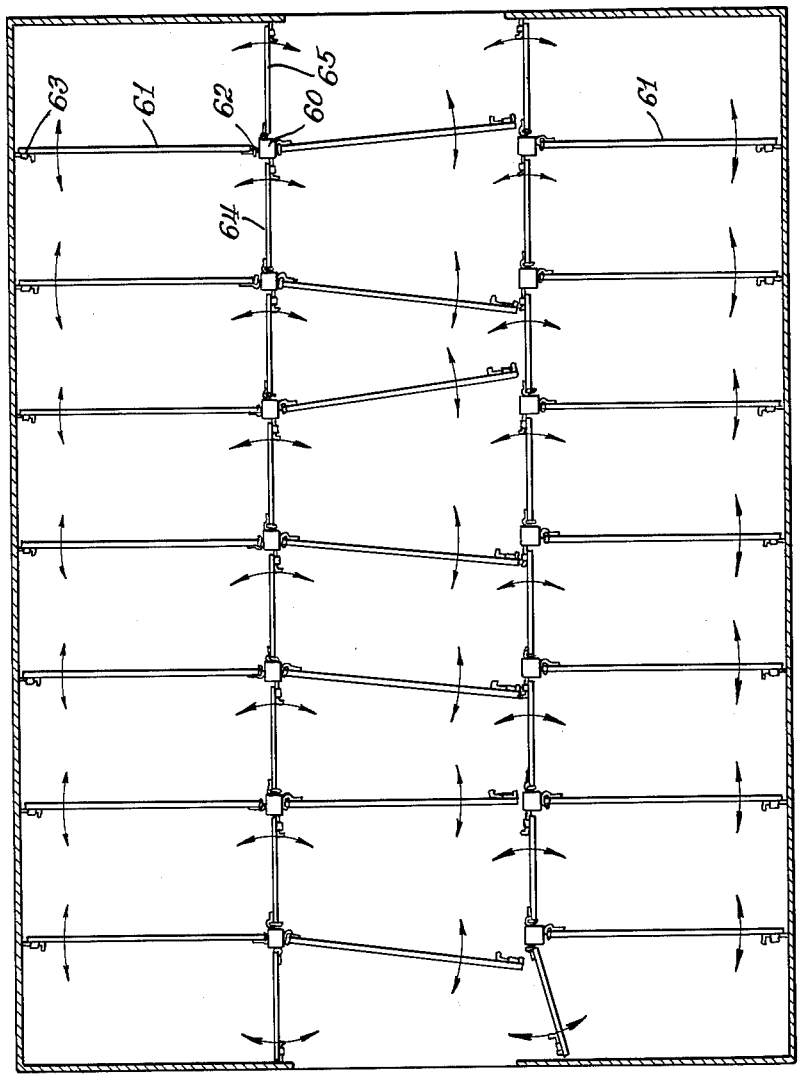

United States Patent Office 3,203,033
Patented Aug. 31, 1965

3,203,033
LIVESTOCK PEN STRUCTURES
George Banse, Sterling, Ill., assignor to National Manufacturing Co., Sterling, Ill., a corporation of Illinois
Filed Oct. 25, 1962, Ser. No. 232,987
2 Claims. (Cl. 16—176)

This invention relates to livestock pen structures and has to do more particularly with a novel livestock pen structure formed at least partially by gates which can be swung open to permit ready access to the pen or pens and which when desired can be entirely removed readily from their pen forming positions and to a novel hinge used in forming the structure.

The present invention is especially well adapted to forming farrowing pens and is described with especial reference to such application but it will be understood that it is adapted for other uses.

Heretofore it has been customary to provide pens in a barn or farrowing house by using partitions which are slid in vertical tracks formed by cleats on vertical posts. The partitions are manually lifted up to remove them from the tracks when it is desired to let the pigs in or out of the pen; also when it is desired to entirely remove the partitions to provide an unobstructed space where the pens are not needed. Since the partitions are usually relatively long and heavy, the lifting is difficult. Also it is time-consuming when it is desired merely to let the stock in or out of the pen.

In accordance with the present invention, means are provided whereby gates are hingedly and removably supported at least at one end from a post, or from the wall of the barn or farrowing house, and are connected at the other end to another post by a similar means or by a simple latch mechanism. The supporting means includes a pintle which can be readily removed as by lifting it to release the adjacent end of the partition. When the partition is provided with such supporting means at both ends it can be entirely removed from its position after removal of the pintle at both ends. On the other hand, where it is desired merely to open the partition in the manner of a gate, it is only necessary to remove one of the pintles. Where the partition is provided with the hinge means at one end and a latch at the other it can be removed readily by merely releasing the latch and removing the pintle. On the other hand, it can be swung on the hinge means by merely releasing the latch mechanism.

An object of the present invention is to provide a novel livestock pen.

Another object is to provide a livestock pen formed essentially of partitions supported from spaced uprights which partitions can be readily installed in pen-forming position and readily removed.

Another object is to provide a livestock pen formed essentially of partitions, each removably supported on an upright at one end and detachably connected at the other end to a second upright spaced from the first upright whereby the partition can be swung relatively to the first upright or can be entirely removed.

Another object is to provide a novel hinge which can be readily disassembled to permit removal of a closure member supported thereby.

A further object is to provide a novel hinge which can be readily disassembled to permit removal of a closure member supported thereby, which hinge can be disassembled upon a relatively short movement of one of the parts thereof.

Other objects and advantages of the invention will appear from the following description taken in connection with the appended drawings wherein:

FIGURE 1 is a top plan view of a farrowing house according to the invention, the roof of the house having been removed;

FIG. 2 is a view of a section taken along line 2—2 of FIG. 1;

FIG. 3 is an enlarged elevational view of one of the gates and its supporting means;

FIG. 4 is a view of a section taken along line 4—4 of FIG. 3;

FIG. 5 is a view of a section taken along line 5—5 of FIG. 3; and

FIG. 6 is a view similar to FIG. 1, only showing diagrammatically a second embodiment of the invention.

Referring now to FIGS. 1 and 2, there is shown a farrowing house having a floor, side walls 1 and 2, end walls 3 and 4 and a roof 5. Outer supporting posts 6 are disposed adjacent to or may form a portion of the end walls 3 and 4, and outer supporting posts 7 are secured adjacent to or may form a portion of the side wall 2. Inner supporting posts 8 are disposed preferably in alignment in the interior of the house as seen particularly in FIG. 1 of the drawings.

A plurality of gates 10 and 13 are provided which are described more in detail hereinafter. Two of the gates 10 are each hinged by a hinge 11 to one of the end posts 6 and are adapted to be latched by a latch 12 to the opposite inner post 8. The remaining gates 13 are hinged respectively to the outer posts 7 by hinges 11 and are adapted to be latched by latches 12 to the corresponding inner posts 8. It will be seen that the arrangement is such that a plurality of farrowing pens 15 are defined between the gates 10 and 13 and the opposing portions of the walls of the farrowing house. A run 16 is defined between the gates 10 and the opposing side wall 1 and adjacent portions of the end walls 3 and 4.

The gate 13 may be of any suitable construction and preferably is formed in a conventional manner with end uprights 20, 21, horizontal members 22, and a bracing member 23. The gate preferably is formed of wood. The gate may be formed in any other suitable manner which will prevent the passage of the animals to be confined in the pen. It is sufficiently strong to be self-supporting and confine the animals but is sufficiently light to permit it to be readily carried to and from its mounted position shown.

The hinge 11 includes upper and lower fixed pintle brackets 25, 26 which are secured in suitably spaced relation on the hinge post 7. The brackets 25, 26 are each formed from a metal strap having a body portion 27 and an outturned flange 28 having an opening 29 therethrough. The brackets 25, 26 are secured to the post in a suitable manner as by bolts 30 and preferably the upper bracket 25 is secured with its flange 28 in the uppermost position and the bracket 26 is secured with its flange located in the lowermost position.

Movable, hinge straps 31, 32 are secured to the gate in upper and lower positions corresponding to the positions of the pintle brackets 25, 26. The hinge straps 31 and 32 each are formed from a strap and each has a main body portion 33, a socket portion 34 defining a bore 35 and an overlapping portion 36 extending along and engaged with the body portion 33. A hole 37 is provided which receives a bolt 38 passing through the gate and through the body portion 33 of the strap which bolt is secured by a nut 39. A second bolt 40 extends through holes 41 in the body portion and overlapping portion and receives a nut 42.

A pintle 45 is provided which extends through the upper and lower pintle brackets 25, 26, and the upper and lower hinge straps 31, 32.

The pintle 45 has a main body portion 46 which preferably is straight and one end 47 which is curved back upon itself and connected to the main body portion 46 by an offset portion 48. The endmost portions 49, 49a of the pintle member 45 are in alignment and extend in the same direction. In the form of hinge shown, the two end portions are directed downwardly.

The end of the gate opposite the hinged end is preferably releasably connected to the adjacent post by a latch which may be of any suitable construction. However, I prefer to form the latch similarly to the latch disclosed and claimed in the co-pending application of Frank W. Duhm, Ser. No. 178,485, filed March 8, 1962, and assigned to the assignee of the present application.

The latch 12, shown more particularly in FIGS. 4 and 5, includes a latching member or bolt 50 having a first leg 51 and a second leg 52 lying in the same plane as the leg 51 but turned at an angle of 90 degrees. The latching member 50 extends through and is supported by a mounting bracket 53 attached to the face of the gate. The latching member 50 has a head 54 which is turned at right angles to the first leg 51 and extends out of the plane of the legs 51 and 52 as seen particularly in FIG. 5.

The second leg 52 has a finger piece 55 by which the latch may be manipulated as will be understood from the following description.

The latching member 51 is both slidably and rotatably supported in the mounting bracket 53 and is adapted to be pivoted or rotated so that the second leg 52 extends substantially perpendicularly to the plane of the face of the gate and the head 54 extends substantially parallel to such plane. The latching member 50 is movable between a projected position as seen in FIGS. 3 and 5 and a retracted position wherein the head 54 is adjacent the mounting bracket 53. The bolt 50 is adapted to be projected to move the head through an opening 56 in a strike 57 and into a recess 58 in the post 8 closed by the strike 57. The bolt may then be rotated to move the head 54 to latching position wherein the latter extends perpendicularly to the plane of the face of the gate and engages behind the strike 57. In this connection, it will be understood that the opening 56 is elongated in a vertical direction and is short in a horizontal direction. Thus the head may be inserted through the opening 56 only when the head is in a vertical position and engages behind the strike 57 when in a horizontal position.

The gate 13 is assembled with the post 7 by registering the hinge straps 31, 32, with the pintle brackets 25, 26, and by inserting the lower end 49a of the pintle 45 through the openings 29 and 35 in the pintle bracket 26, and hinge strap 32, and by inserting the upper end 49 through the openings 29 and 35 of the pintle bracket 25 and hinge strap 31.

It will be seen that by reason of the novel form of a pintle 45 the hinge can be readily assembled and disassembled even where there is very little head room as, for example, in a farrowing pen. The upper end 47 being curved back upon itself serves to maintain the pintle in proper pivot-forming position in the hinge members. However, because of the fact that the end 49 is relatively short, the pintle 45 can be removed from the hinge straps and pintle brackets upon only a relatively short movement.

Any of the gates 10 can be released for swinging movement on its hinge by merely releasing the latch 12. Thus the gate can be swung to an open position to allow the livestock to move from the run 16 into any selected farrowing pen 15. Likewise, any of the gates 13 may be released and swung on its hinge to permit livestock to move from one pen to an adjacent pen.

Where it is desired to provide a larger pen, any one or more of the gates 13 may be entirely removed by merely releasing the latch 12 and removing the corresponding pintle 45 by a simple upward lifting movement to disengage it from the hinge straps and pintle brackets through which it passes. Thus the gate may be moved to a storage position and will not interfere with the passage of livestock between pens. On the other hand, it may be desired to provide an entirely open space within the farrowing house or barn in which case all of the gates are removed and stored. It will be seen that the construction of the hinge is such that the gate need not be lifted to any elevated position in order to remove it from the hinge, but it is necessary merely to remove the pintle and then remove the gate laterally away from the pintle brackets.

Other arrangements of pen-forming gates than that shown in FIG. 1 may be employed without departing from the spirit of the invention. An alternative arrangement of pens is shown in FIG. 6 to which reference now is made. In the construction shown, a plurality of rows of spaced posts 60 are provided which posts are in alignment in each row. A first series of gates 61 are swingably supported by hinges 62 to the post 60 and are adapted to be latched at their outer ends by latches 63 to a post (not shown) or the side wall of the building. A second series of gates 64 are hinged to the posts 60 at one end and are latched at the other end to the adjacent post 60. The endmost gates 65 are hinged at one end to the end posts 60 and are latched at their other ends to a post (not shown) or to the wall of the building. In this construction, no run is provided, but it is necessary to open certain of the gates in adjacent pens to permit access to a particular pen.

In this construction, as in the construction of FIG. 1, the hinge construction permits any selected gate or gates to be either swung open to permit the passage of livestock or to be entirely removed to provide an unobstructed space in the area formerly occupied by two or more pens.

It will be understood that instead of providing a hinge at one end of the gate and a simple latch mechanism at the other end of the gate, the gate may be attached to the supporting structure at both ends by a hinge mechanism formed in acordance with the invention. Thus, the hinge at either end may be released to allow the gate to be swung open or the hinges at both ends may be released to permit the gate to be entirely removed.

I claim:

1. A hinge set for use in supporting a swingable and detachable closure member on a supporting member, comprising a pair of L-shaped pintle brackets, each of said pintle brackets having a plurality of mounting apertures in one side thereof and a single pintle receiving opening in the second side thereof, a pair of hinge strap members, each of said hinge strap members having a portion thereof bent back upon itself in partial overlapping relationship to provide a pintle receiving opening, said hinge strap members having mounting apertures both through said overlapped portions and through said unoverlapped portions, said pintle brackets and said hinge strap members being contiguously positioned with said pintle receiving openings in mutual alignment, said second sides of said brackets and said hinge strap members being in mutual engagement and cooperating when in use to prevent vertical movement of said hinge strap members relative to said brackets, pintle means loosely extending through said pintle receiving openings for pivotally joining said pintle brackets and said hinge strap members, said pintle means having an offset bent portion to prevent the vertical dropping of said pintle means through said members, said pintle means being removable from said members upon a short vertical lift thereof, thereby permitting said closure member to be both swingably mounted and completely detached as desired.

2. A hinge set as in claim 1 wherein said pintle means has one end thereof offset and bent back into alignment with the major body portion thereof.

References Cited by the Examiner

UNITED STATES PATENTS

| | | | |
|---|---|---|---|
| 890,368 | 6/08 | Montgomery | 16—176 |
| 1,131,403 | 3/15 | Matthews | 16—130 |
| 1,139,524 | 5/15 | Hodgin | 16—130 |
| 1,309,071 | 7/19 | Johnson | 119—16 |
| 2,041,850 | 5/36 | Melik | 16—176 |
| 2,255,806 | 9/41 | Overson | 119—16 |

FOREIGN PATENTS

| | | |
|---|---|---|
| 73,910 | 10/17 | Australia. |
| 238,215 | 3/62 | Australia. |
| 534,438 | 12/56 | Canada. |

DONLEY J. STOCKING, *Primary Examiner.*

CARL W. ROBINSON, *Examiner.*